United States Patent [19]
Ikawa

[11] Patent Number: 6,141,320
[45] Date of Patent: *Oct. 31, 2000

[54] METHOD AND APPARATUS FOR NESTED AUTOMATIC PROTECTION SWITCHING

[75] Inventor: Fumihiro Ikawa, Kawasaki, Japan

[73] Assignee: Fujitsu Limited, Kawasaki, Japan

[*] Notice: This patent is subject to a terminal disclaimer.

[21] Appl. No.: 08/934,505

[22] Filed: Sep. 19, 1997

[30] Foreign Application Priority Data

Mar. 19, 1997 [JP] Japan ................................. 9-066566

[51] Int. Cl.[7] ........................................................ H04J 1/16
[52] U.S. Cl. ........................ 370/227; 370/226; 340/825.01
[58] Field of Search ..................................... 370/226, 227, 370/223, 359, 243; 340/825.01, 825.16, 825.5, 827

[56] References Cited

U.S. PATENT DOCUMENTS 5,278,824  1/1994  Kermer .................................... 370/223
5,872,780  2/1999  Demiray et al. ........................ 370/359
5,978,354  11/1999  Taketomi et al. ...................... 370/226

FOREIGN PATENT DOCUMENTS 7-177114  7/1995  Japan .

*Primary Examiner*—Edwin C. Holloway, III
*Attorney, Agent, or Firm*—Helfgott & Karas, PC.

[57] ABSTRACT

Nested APS is implemented in a simple configuration for synchronous transmission systems such as SONET and SDH. Bits 5 to 8 of the received K1 byte are compared with line numbers of lines terminated at the receiving node, and when they do not match, the received K1 byte is sent via a first selection circuit for further transmission. At the same time, the K2 byte incoming from the opposing direction is redirected via second selection circuit for transmission.

8 Claims, 7 Drawing Sheets

UNIDIRECTIONAL MODE

METHOD AND APPARATUS FOR NESTED AUTOMATIC PROTECTION SWITCHING

BACKGROUND OF THE INVENTION

1. Field of the Invention

The present invention relates to a method and apparatus for nested automatic protection switching (nested APS) in which a communication line running over a plurality of sections is recovered using a series connection of protection lines provided in each section by communicating using a command and response defined in the overhead of each section, and more particularly to a method and apparatus for implementing nested APS by using the K1 and K2 bytes defined for APS in the Synchronous Optical Network (SONET) established by the American National Standards Institute (ANSI) or the Synchronous Digital Hierarchy (SDH) standardized in accordance with International Telecommunications Union-Telecommunications Standardization Sector (ITU-T) recommendations.

2. Description of the Related Art

Some communication paths established over physical lines may end at a certain node, and others may just pass through that node. When the capacity of a communication path just passing through a node is large, it is required that the physical lines be simply connected by a regenerator (REG) to reduce the cost, and also that the communication path be recovered using a series connection of protection lines provided in each section between opposing nodes without providing separate protection lines for such physical lines. The APS in which a communication line running over a plurality of sections is recovered using a series connection of protection lines provided in each section is generally known as nested APS.

In SONET and SDH, the K1 and K2 bytes are defined in the section overhead (SOH) for signaling for APS operations. Since these K1 and K2 bytes are transferred only within a section, if, for a communication line running over a plurality of sections, the contents of these bytes can be transmitted to an adjacent section, nested APS can be realized in SONET and SDH.

Japanese Unexamined Patent Publication No. 7-177114 proposes a technique for transmitting the contents of the K1 and K2 bytes to a node not directly opposing the originating node, by moving the contents of the K1 and K2 bytes in the SOH to the Z3 and Z4 bytes in the path overhead (POH).

However, some paths may end at that node and others may just pass through it; therefore, in order to carry the K1 and K2 bytes on the passing path without fail, the above technique would require checking which path is the passing path and performing POH processing for that path, but in practice this is very difficult.

SUMMARY OF THE INVENTION

It is accordingly an object of the present invention to provide a method and apparatus for implementing nested APS in a simple configuration for synchronous transmission systems such as SONET and SDH.

According to the present invention, there is provided a nested automatic protection switching apparatus for performing automatic protection switching for a communication line going from a first node to a third node via a second node by using a command and a response to be terminated at the second node, comprising: a line identifier comparing circuit for comparing an identifier of a line to be recovered, which is carried in a first command requesting a switching, with an identifier of a line terminated at the second node; a command selector for selecting the first command for transmission to the third node when the result of the comparison from the line identifier comparing circuit indicates a mismatch, or a second command issued to the third node by the second node for transmission to the third node when the result indicates a match; and a response selector for selecting a first response from the third node for transmission to the first node when the result of the comparison from the line identifier comparing circuit indicates a mismatch, or a second response issued to the first node by the second node for transmission to the first node when the result indicates a match.

According to the present invention, there is also provided a nested automated protection switching method for performing automatic protection switching for a communication line going from a first node to a third node via a second node by using a command and a response to be terminated at the second node, comprising the steps of: comparing an identifier of a line to be recovered, which is carried in a first command requesting a switching, with an identifier of a line terminated at the second node; selecting the first command for transmission to the third node when the result of the comparison indicates a mismatch, or a second command issued to the third node by the second node for transmission to the third node when the result indicates a match; and selecting a first response from the third node for transmission to the first node when the result of the comparison indicates a mismatch, or a second response issued to the first node by the second node for transmission to the first node when the result indicates a match.

DESCRIPTION OF THE PREFERRED EMBODIMENTS

Figure 1:
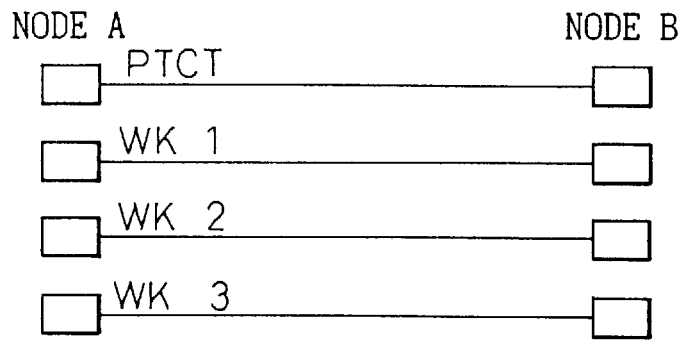
FIG. 1 is a diagram showing three working lines and a protection line.

Before describing the preferred embodiments of the present invention, APS operations using the K1 and K2 bytes in SONET and SDH will be described first. Consider the arrangement shown in FIG. 1 where three working lines WK1 to WK3 and a protection line PTCT are provided between node A and node B.

Figure 2:
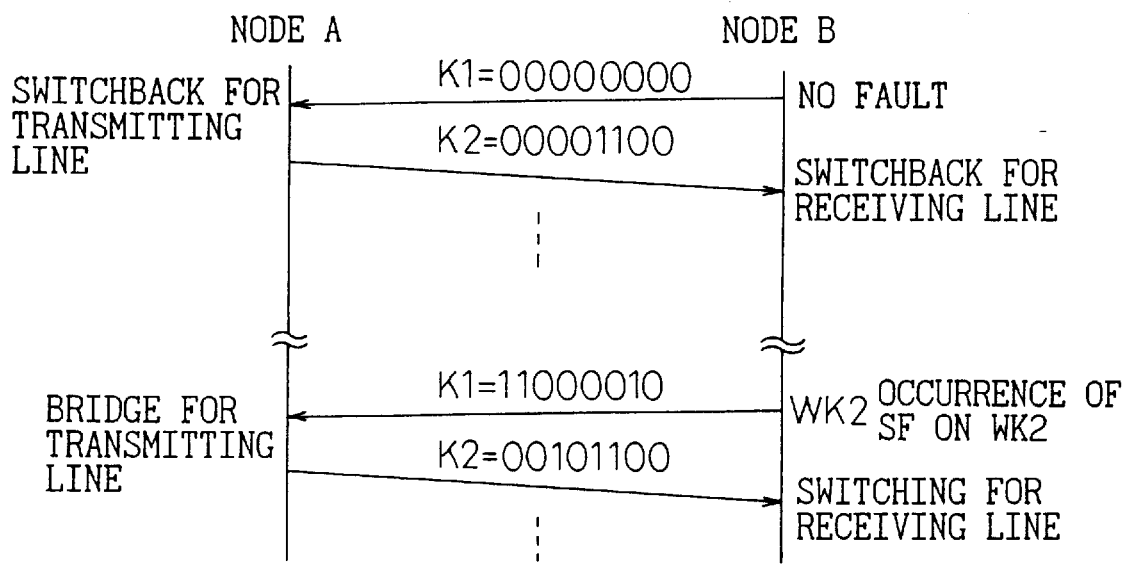
FIG. 2 is a diagram showing an APS sequence in a unidirectional mode.

APS can be classified into two modes: the unidirectional mode in which switching control is performed independently in each of the two directions, and the bidirectional mode in which switching control is performed simultaneously in both directions. FIG. 2 shows an example of an APS sequence in the unidirectional mode for the direction from node A to node B, and FIG. 3 shows an example of an APS sequence in the bidirectional mode.

In FIG. 2, when the working lines WK1 to WK3 going from node A to node B are all operating normally, "00000000" as the value of K1 is continuously sent from node B to node A over the protection line PTCT. Here, the four high-order bits (bits 1 to 4) "0000" of K1 means no request. From node A to node B, "00001100" as the value of K2 is continuously sent. Here, the three low-order bits (bits 6 to 8) "100" of K2 indicates unidirectional mode, and "1" in bit 5 indicates 1:n mode. In this condition, the facilities are switched back to the working lines at both the sending node A and the receiving node B.

When the receiving node B detects the occurrence of a signal failure (SF) on the working line WK2, for example, "11000010" as the K1 byte is sent from node B to node A. The value "1100" in bits 1 to 4 of the K1 byte means a switching request caused by a SF, and "0010" in bits 5 to 8 indicates a line number assigned to the line that needs switching, meaning that the request is for WK2 to be switched to the protection line. The higher the value meant by the switching request in bits 1 to 4, the higher the degree of urgency (priority). In response to the switching request from node B, node A first performs bridge processing whereby the information to be sent on WK2 is sent on WK2 and PTCT in parallel, and then sends "00101100" as the value of K2. Here, the value "0010" in bits 1 to 4 of K2 is the same as the value in bits 5 to 8 of the K1 sent from node B, and means that bridge processing has been performed for WK2 in response to the K1. In response, node B switches the receiving line from WK2 to PTCT. For the direction from node B to node A also, APS is performed using a similar sequence by sending K1 and K2 in opposite directions independently of the above operation.

Figure 3:
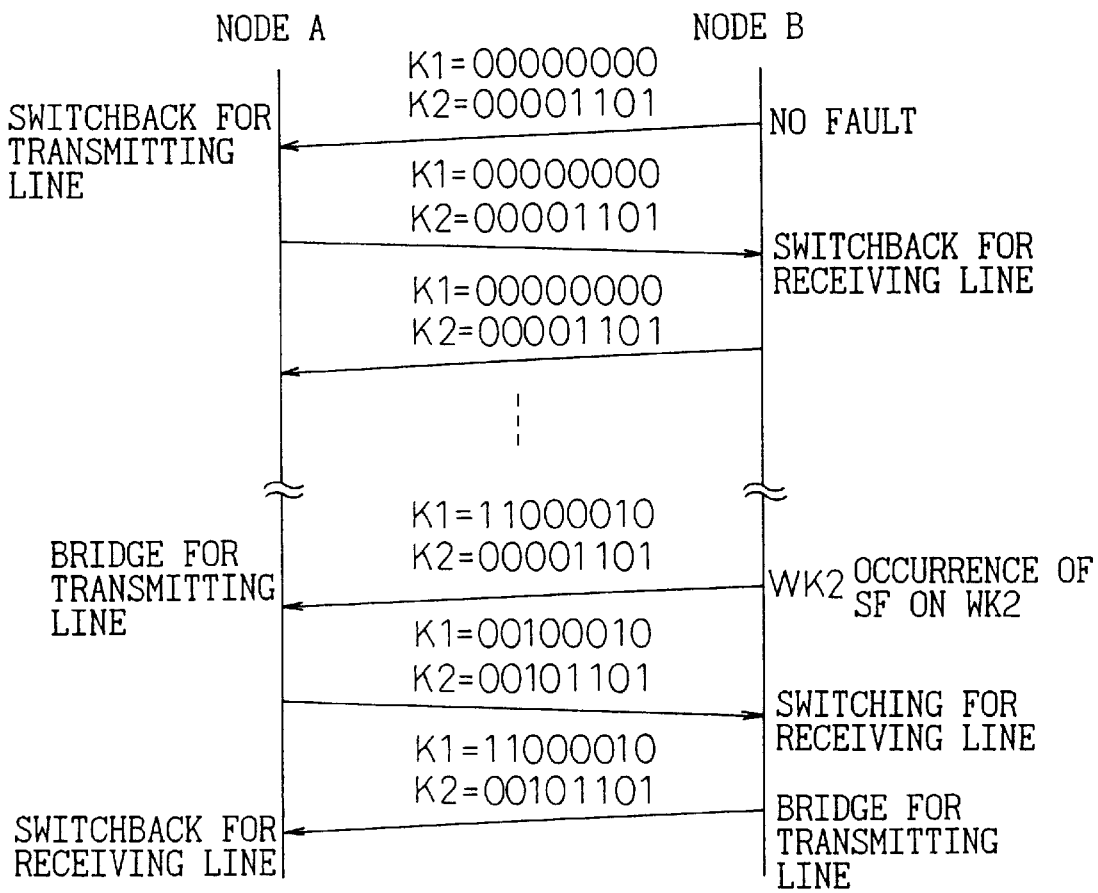
FIG. 3 is a diagram showing an APS sequence in a bidirectional mode.

In the bidirectional mode of FIG. 3, when WK1 to WK3 are operating normally, "00000000" as the K1 byte and "00001101" as the K2 byte are continuously sent in both directions. Here, the value, "101" in bits 6 to 8 of the K2 byte indicates the bidirectional mode. Otherwise, the bit patterns are the same as those in the unidirectional mode.

When node B detects the occurrence of an SF and WK2, the value of the K1 byte from node B to node A changes to "11000010". In response, node A changes the K2 byte to "00101101" and the K1 byte to "00100010" after performing bridge processing for WK2. As in the unidirectional mode, the value, "0010" in bits 1 to 4 of the K2 byte indicates the line number for which the bridge processing has been performed. The value "0010" in bits 1 to 4 of the K1 byte means a reverse request (RR). In response, node B switches the receiving line to PTCT, while performing bridge processing for transmission going in the opposite direction with the K2 byte now changed to "00101101". In response, node A performs switching for the receiving line.

As is apparent from the above description, it can be said that the K1 and K2 bytes are respectively a command and a response answering the command.

Figure 4:
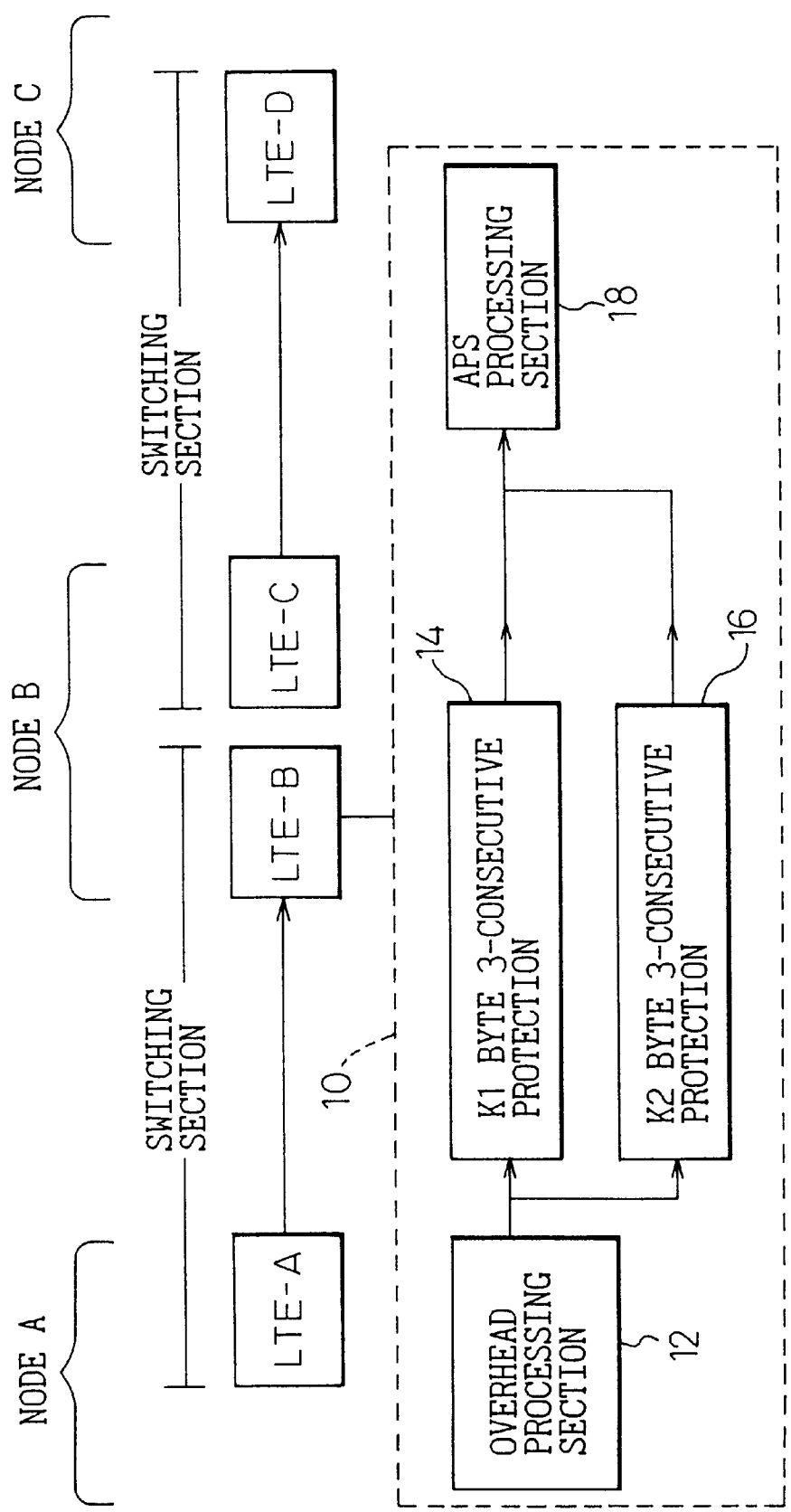
FIG. 4 is a block diagram showing a simplified schematic of a prior art APS apparatus.
Figure 5:
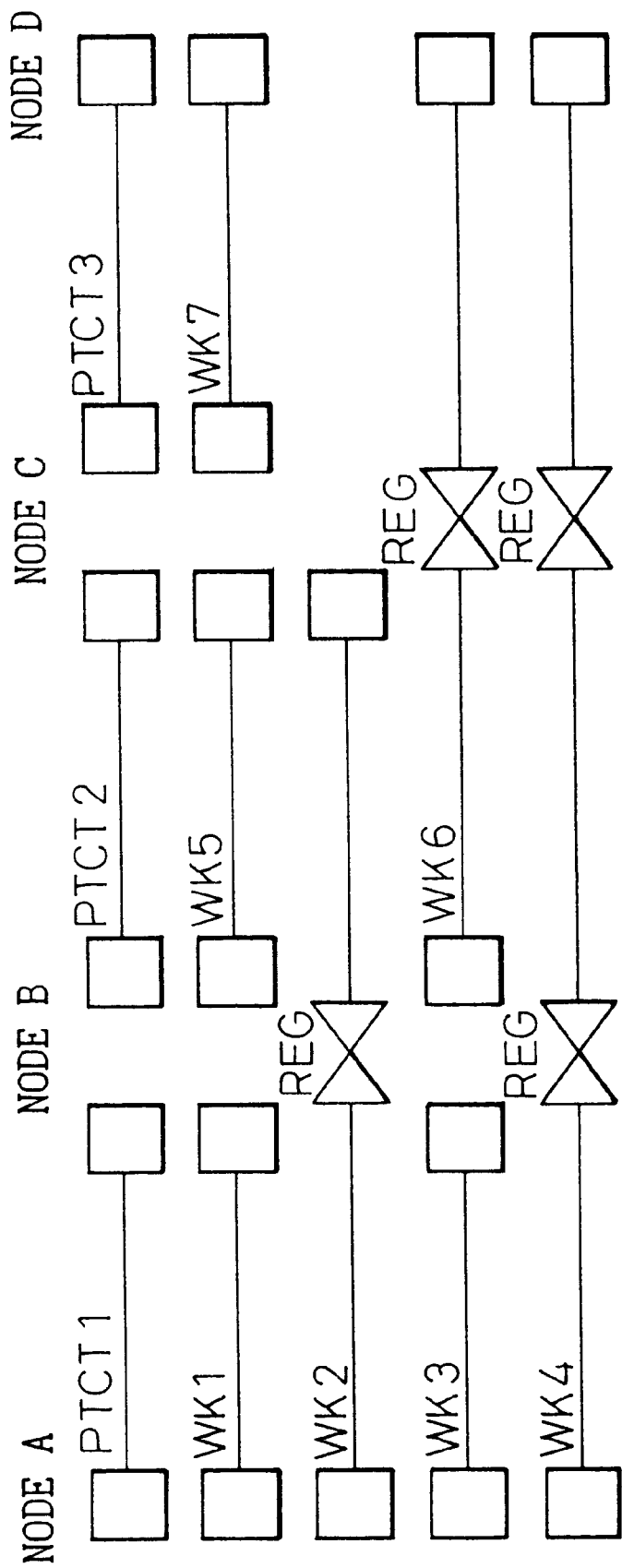
FIG. 5 is a diagram showing nested APS.

FIG. 4 shows a simplified schematic of a prior art apparatus for APS processing wherein the K1 and K2 bytes are transferred only between opposing nodes. In FIG. 4, a line terminating equipment A (LTE-A) for terminating the line between node A and node B is provided at node A, and a LTE-B for terminating the line between node A and node B and a LTE-C for terminating the line between node B and node C are provide at node B, while a LTE-D for terminating the line between node B and node C is provided at node C. Within the block 10 enclosed by dashed lines is shown, in simplified form, the configuration of the apparatus for APS processing within the LTE-B. An overhead processing section 12 extracts the K1 and K2 bytes on a protection line from node A. The extracted K1 and K2 bytes are fed into 3-consecutive protection sections 14 and 16, respectively, where the respective bytes are declared valid when identical values are detected in three consecutive bytes. An APS processing section 18 performs APS processing in accordance with the previously described sequence. The other LTEs are also provided with an identical apparatus. In this way, the K1 and K2 bytes are terminated within each switching section; as a result, as shown in FIG. 5, for example, if the working line WK2 going from node A to node C by being relayed via the regenerator at node B is to be recovered using protection lines PTCT1 and PTCT2 provided between A and B and between B and C the contents of the K1 and K2 bytes need to be transmitted across the section boundary.

Figure 6:
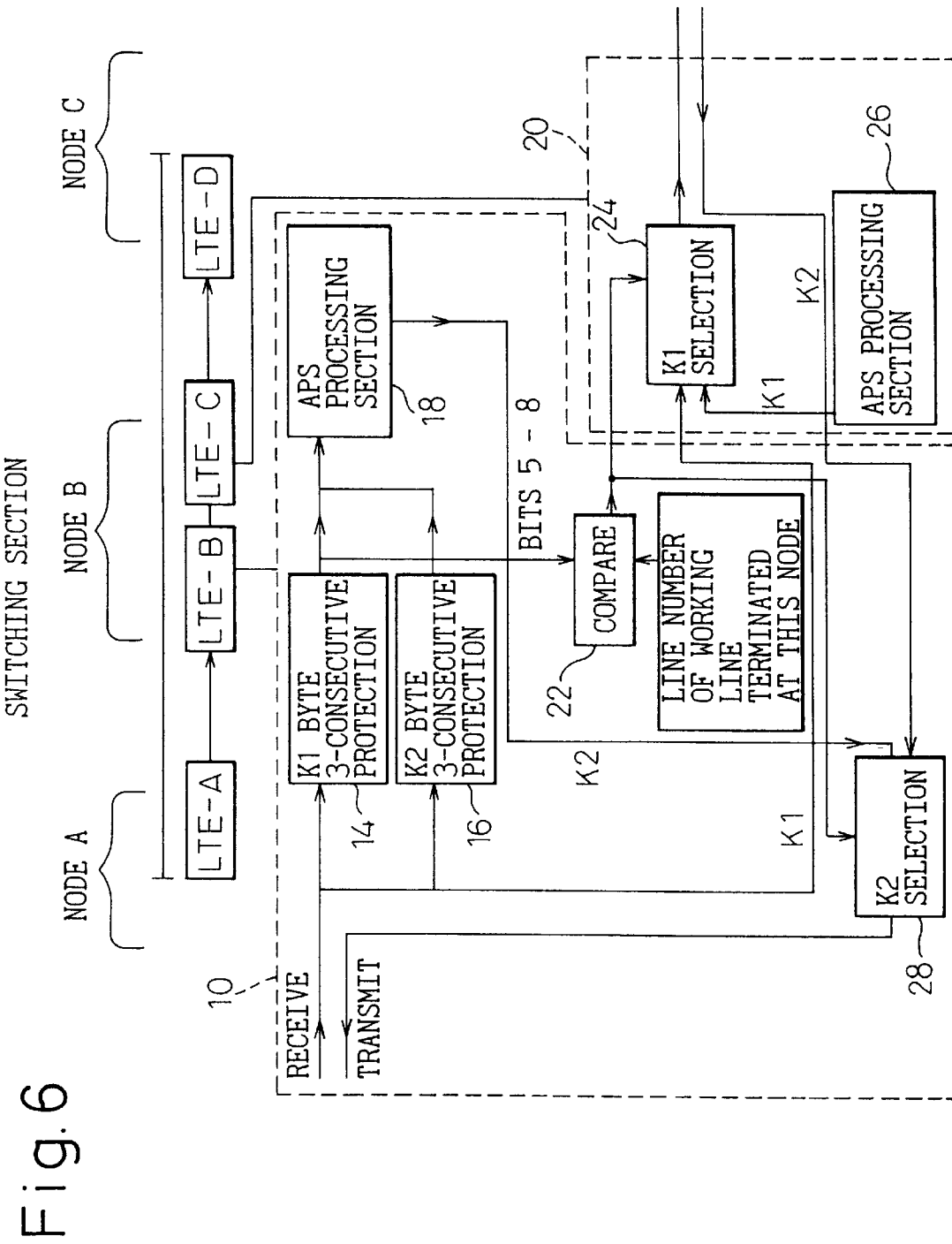
FIG. 6 is a diagram showing a nested APS apparatus according to a first embodiment of the present invention.

FIG. 6 shows a nested APS apparatus according to a first embodiment of the present invention. The same constituent elements as those in FIG. 4 are designated by the same reference numerals, and description of such elements will not be repeated here. A portion of the apparatus for APS processing within the LTE-C is shown within the block 20 enclosed by dashed lines.

A comparing circuit 22 compares bits 5 to 8 of the K1 byte output from the 3-consecutive protection section 14 with line numbers of the lines terminated at this node, and outputs the result of the comparison indicating a match or a mismatch. A K1 selection circuit 24 within the block 20 for the LTE-C is supplied with the K1 byte that an APS processing section 26 in the block 20 issues to node C and the K1 byte that the LTE-B receives from node A, and selects the K1 byte received from node A for transmission to node C when the result of the comparison from the comparing circuit 22 indicates a mismatch, or the K1 byte issued by the APS processing section 26 when the result indicates a match. The K1 byte selected by the K1 selection circuit 24 is sent to node C over a protection line between the nodes B and C. A K2 selection circuit 28 is supplied with the K2 byte that the LTC-C receives from node C and the K2 byte that the APS processing section 18 in the LTE-B issues to node A, and selects the K2 byte that the LTE-C receives from node C when the result of the comparison from the comparing circuit 22 indicates a mismatch, or the K2 byte from the APS processing section 18 when the results indicates a match. Though not shown in the figure, a circuit of the same configuration is provided for the K1 byte flowing from node C to node A and the K2 byte flowing from node A to node C.

In the first embodiment of the present invention shown in FIG. 6, when the line number carried in the K1 byte received at node B from node A does not match line numbers of the lines terminated at node B, the K1 byte is passed on to node C, while at the same time, the K2 byte from node C is transferred to node A. Accordingly, nested APS can be achieved with minimum modifications and without basically altering the SONET/SDH communication protocols for the K1 and K2 bytes.

While the first embodiment of the present invention is applicable in both the unidirectional and bidirectional modes, it involves a problem in that even when the priority of the K1 byte to be transferred beyond the section is lower than that of the K1 byte within that section, priority is always given to the K1 byte to be transferred beyond the section.

Figure 7:
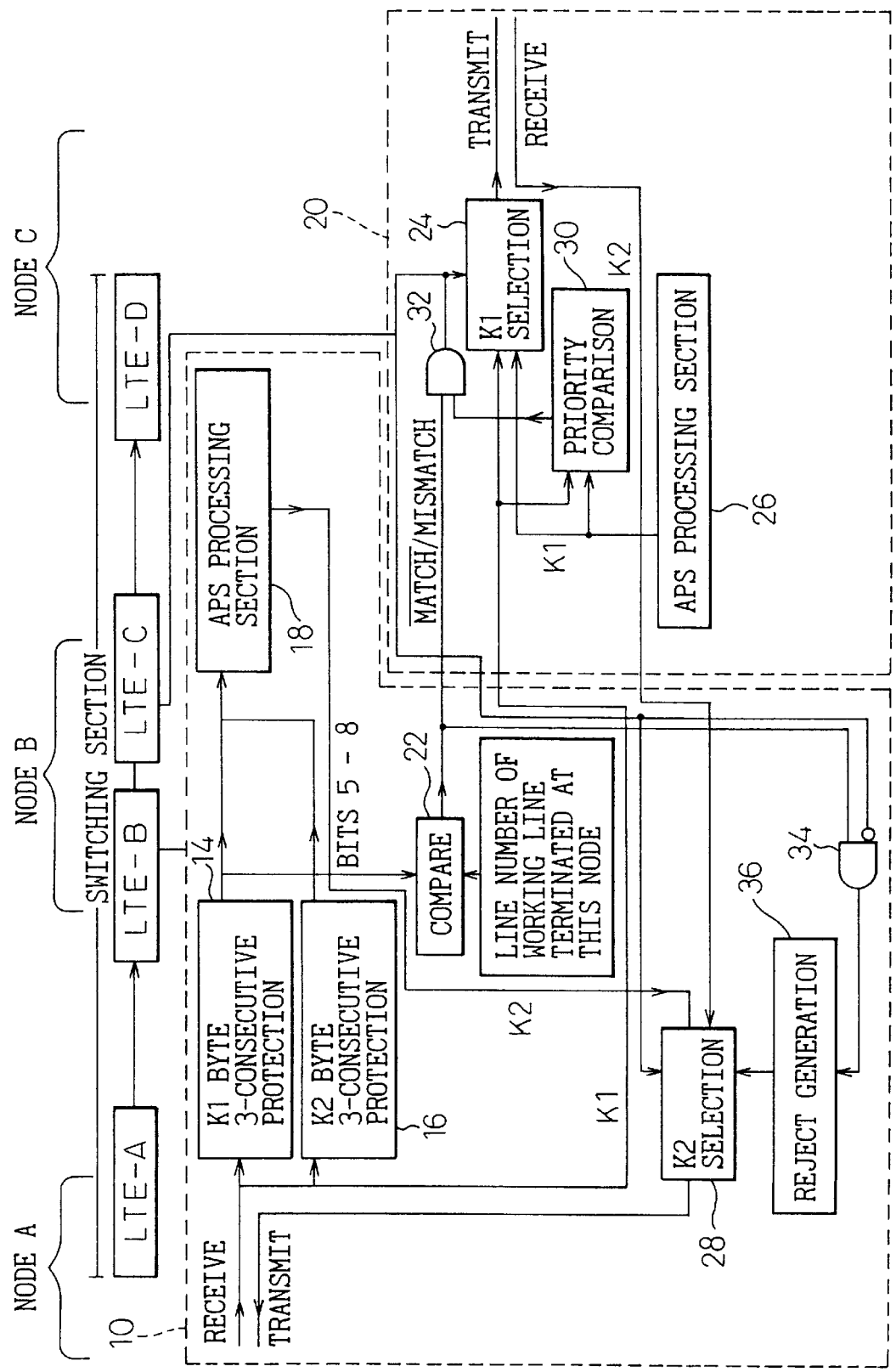
FIG. 7 is a diagram showing a nested APS apparatus according to a second embodiment of the present invention.

FIG. 7 shows the configuration of a nested APS apparatus according to a second embodiment of the present invention which improves on this point. This embodiment is applicable only in the unidirectional mode. The same constituent elements as those in FIG. 6 are designated by the same reference numerals, and description of such elements will not be repeated here.

A priority comparing circuit 30 compares the magnitude of the value indicated by bits 1 to 4 between the K1 byte received at node B from node A and the K1 byte that the APS processing section 26 at node B for the LTE-C issues to node C, and thereby determines which switching request has higher priority. When the priority comparing circuit 30 determines that the K1 byte from the APS processing section 26 has higher priority, an AND gate 32 is closed to have the K1 selection circuit 24 select the K1 byte from the APS processing section 26, invalidating the result of the comparison from the comparing circuit 22 even if the result indicates a mismatch. When the result of the comparison from the comparing circuit 22 is invalidated by the AND gate 32 even if the result indicates a mismatch, a gate circuit 34 outputs a signal to cause a reject generating circuit 36 to generate a K2 byte indicating a reject. The K2 byte generated by the reject generating circuit 36 is sent via the K2 selection circuit 28 for transmission to node A. This prevents the occurrence of an error condition where the switching request K1 byte sent from node A to nodes B and C is received only at node B but does not reach node C and, therefore, the K2 byte as a response is not returned within a prescribed period of time. Of the values indicated by bits 6 to 8 of the K2 byte, 011, 010, 001, and 000 are reserved for nested APS, and one of these values, for example, 001, is used for a reject response.

Figure 8:
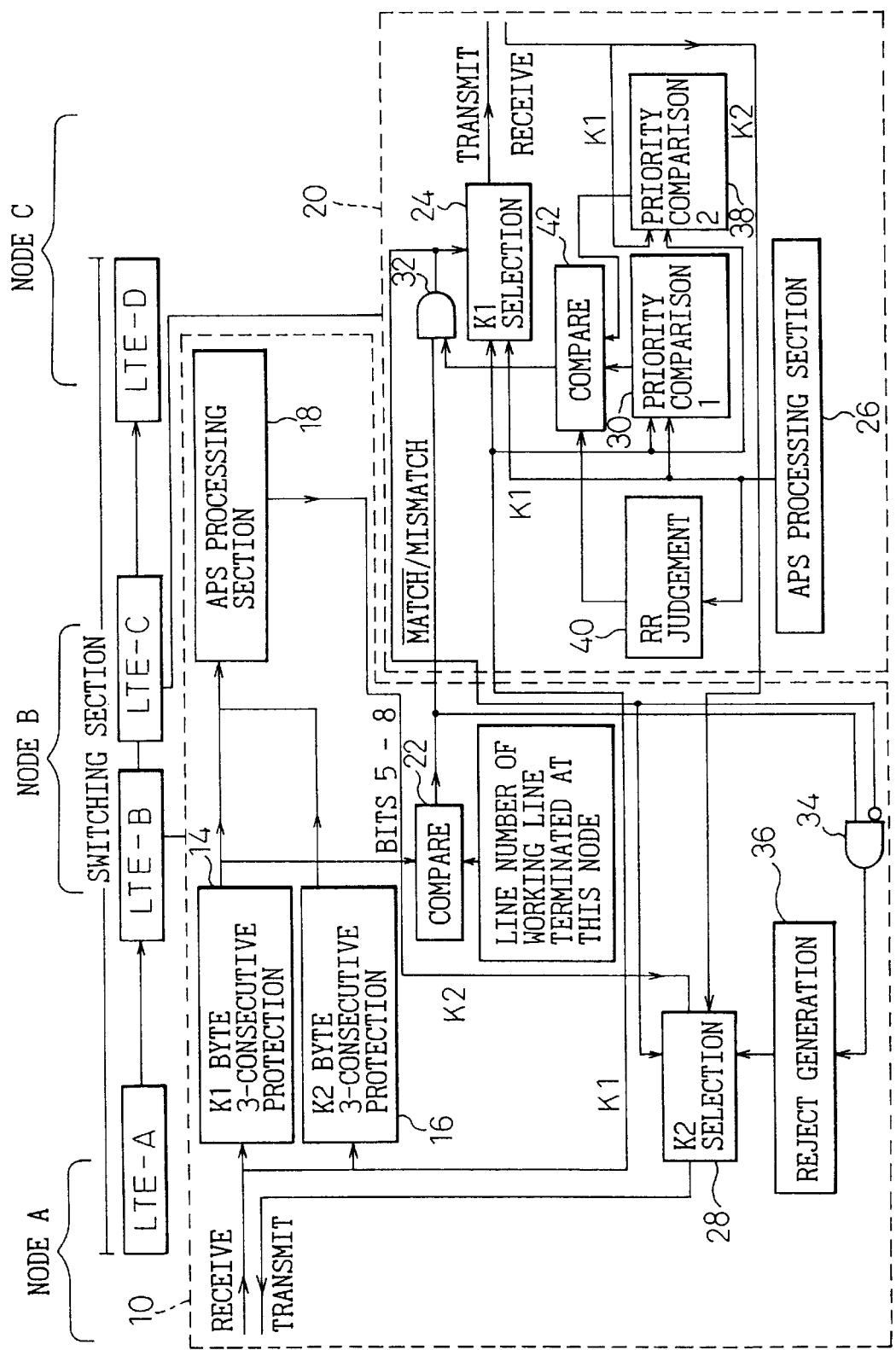
FIG. 8 is a diagram showing a nested APS apparatus according to a third embodiment of the present invention.

FIG. 8 shows a nested APS apparatus according to a third embodiment of the present invention which is also applicable in the bidirectional mode. The same constituent elements as those in FIG. 7 are designated by the same reference numerals, and a description of such elements will not be repeated here. In the bidirectional mode, after bridging the connection in one direction, a reverse request (RR) is issued for the reverse direction, as explained with reference to FIG. 3. At this time, since bits 1 to 4 of the K1 byte is 0010, if the value in bits 1 to 4 is simply compared in the priority comparing circuit 30, this reverse request is lowest in priority. The true cause for switching, however, is indicated by bits 1 to 4 of the K1 byte being transmitted in the opposing direction. Therefore, the priority is compared by a second priority comparing circuit 38 with that of the K1 byte incoming from the opposing direction. When it is judged by an RR judging circuit 40 that the K1 byte indicates an RR, then a selection circuit 42 selects the output of the priority comparing circuit 38 instead of the output of the priority comparing circuit 30, for application to the AND gate 32. In this way, priority can be compared correctly for an RR in the bidirectional mode.

As described above, according to the present invention, nested APS can be achieved with minimum modifications, without basically altering the protocols currently defined for communications between opposing nodes.

What is claimed is:

1. A nested automatic protection switching apparatus for performing automatic protection switching for a communication line going from a first node to a third node via a second node by using a command and a response to be terminated at said second node, comprising:

a line identifier comparing circuit for comparing an identifier of a line to be recovered, which is carried in a first command requesting a switching, with an identifier of a line terminated at said second node;

a command selector for selecting said first command for transmission to said third node when the result of the comparison from said line identifier comparing circuit indicates a mismatch, or a second command issued to said third node by said second node for transmission to said third node when said result indicates a match; and a response selector for selecting a first response from said third node for transmission to said first node when the result of the comparison from said line identifier comparing circuit indicates a mismatch, or a second response issued to said first node by said second node for transmission to said first node when said result indicates a match.

2. A nested automatic protection switching apparatus according to claim 1, further comprising:

a first priority comparing circuit for comparing priority between said first command and said second command; and a first gate circuit for causing said command selector and said response selector to select said second command and said second response, respectively, by invalidating the result of the comparison from said line identifier comparing circuit when the result of the comparison from said first priority comparing circuit indicates that the priority of said first command is lower than the priority of the second command.

3. A nested automatic protection switching apparatus according to claim 2, further comprising:

a second priority comparing circuit for comparing priority between said first command and a third command received from said third node;

a reverse request judging circuit for judging whether said second command is a command requesting switching for a reverse direction in a bidirectional mode; and a comparison result selector for selecting the result of the comparison from said first priority comparing circuit for supply to said first gate circuit when the result of the judgement from said reverse request judging circuit is false, or the result of the comparison from said second priority comparing circuit for supply to said first gate circuit when the result of the judgement is true.

4. A nested automatic protection switching apparatus according to claim 2, further comprising:

a reject generating circuit for generating a response rejecting a request in response to said first command; and a second gate circuit for causing said reject generating circuit to generate said reject response when the result of the comparison from said line identifier comparing circuit indicates a mismatch and when said result of the comparison is invalidated by said first gate circuit.

5. A nested automatic protection switching method for performing automatic protection switching for a communication line going from a first node to a third node via a second node by using a command and a response to be terminated at said second node, comprising the steps of:

(a) comparing an identifier of a line to be recovered, which is carried in a first command requesting a switching, with an identifier of a line terminated at said second node;

(b) selecting said first command for transmission to said third node when the result of the comparison in step (a) indicates a mismatch, or a second command issued to said third node by said second node for transmission to said third node when said result indicates a match; and (c) selecting a first response from said third node for transmission to said first node when the result of the comparison in step (a) indicates a mismatch, or a second response issued to said first node by said second node for transmission to said first node when said result indicates a match.

6. A nested automatic protection switching method according to claim 5, further comprising the steps of:

(d) comparing priority between said first command and said second command; and (e) selecting said second command and said second response in steps (b) and (c), respectively, by invalidating the result of the comparison in step (a) when the result of the comparison in step (d) indicates that the priority of said first command is lower than the priority of the second command.

7. A nested automatic protection switching method according to claim 6, further comprising the steps of:

(f) comparing priority between said first command and a third command received from said third node;

(g) judging whether said second command is a command requesting switching for a reverse direction in a bidirectional mode; and (h) using in step (e) the result of step (f) instead of the result of step (d) when the result of the judgement in step (g) is true.

8. A nested automatic protection switching method according to claim 6, further comprising the step of:

generating a reject response for rejecting a request in response to said first command when the result of the comparison in step (a) indicates a mismatch and when said result of the comparison is invalidated in step (e).

* * * * *